Figure 1:
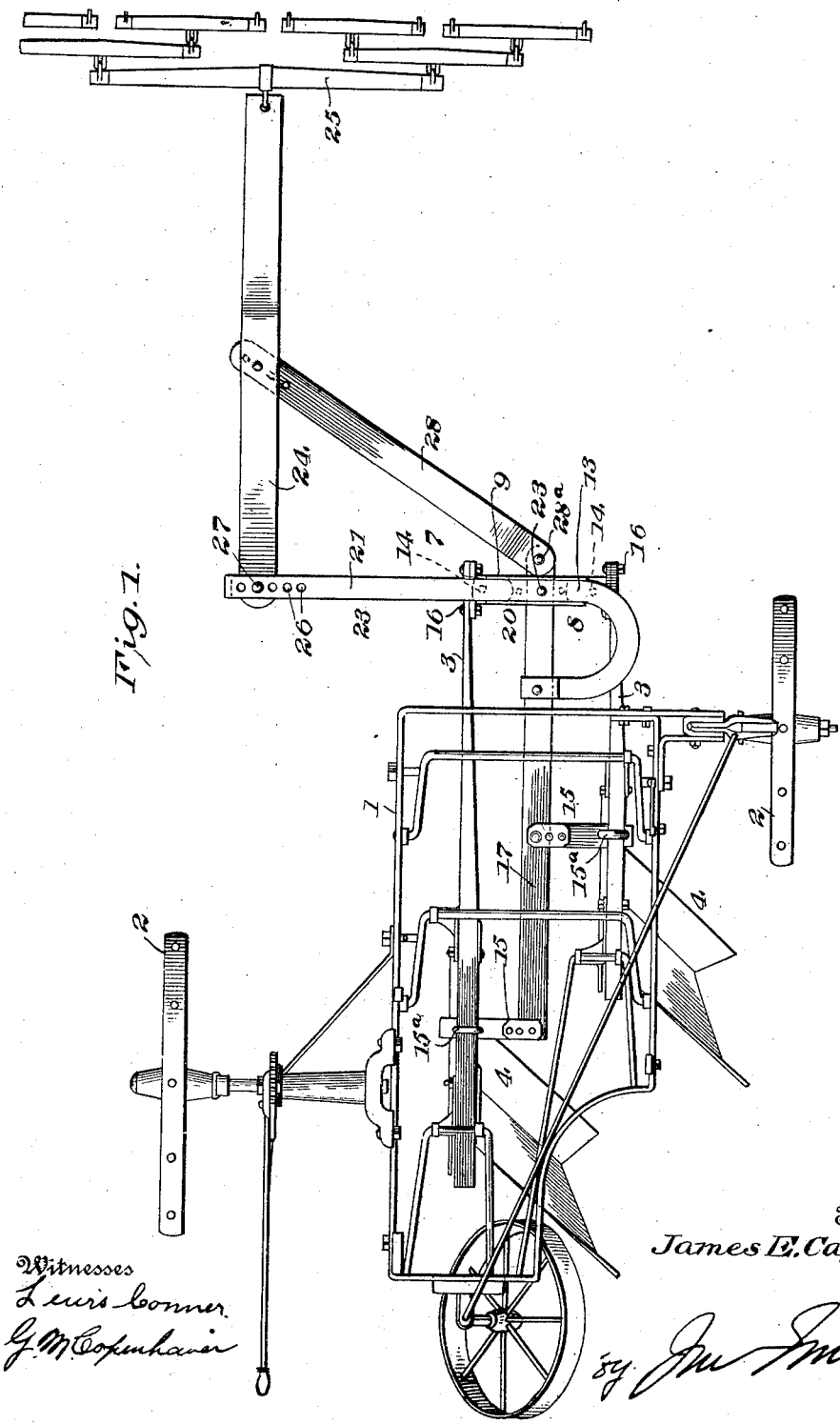

J. E. CAYWOOD.
DRAFT EVENER.
APPLICATION FILED OCT. 1, 1909.

965,080.

Patented July 19, 1910.
2 SHEETS—SHEET 1.

Witnesses
Lewis Conner
G. M. Copenhaver

Inventor
James E. Caywood
by Jno Imire
Attorney

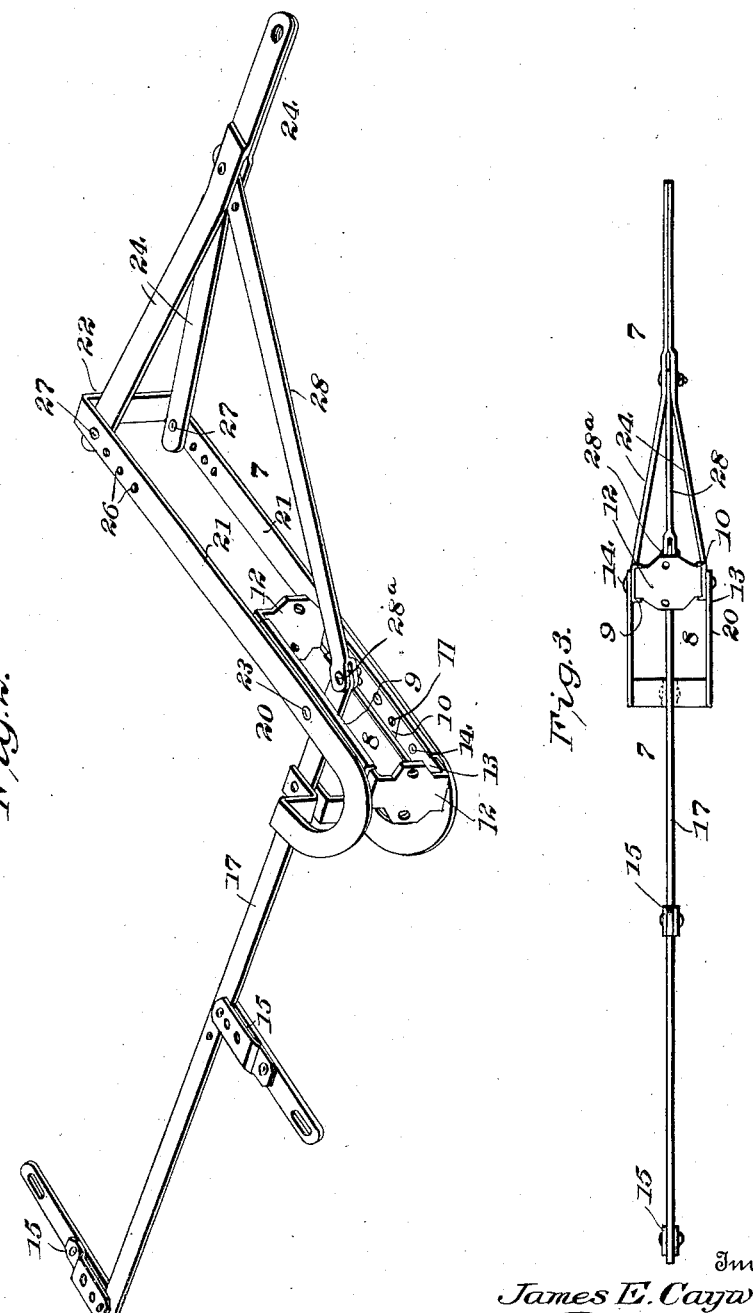

UNITED STATES PATENT OFFICE.

JAMES E. CAYWOOD, OF JACKSONVILLE, ILLINOIS, ASSIGNOR OF ONE-THIRD TO FELIX E. FARRELL AND ONE-THIRD TO CHARLES A. BARNES, OF JACKSONVILLE, ILLINOIS.

DRAFT-EVENER.

965,080.      Specification of Letters Patent.     Patented July 19, 1910.

Application filed October 1, 1909. Serial No. 520,544.

*To all whom it may concern:*

Be it known that I, JAMES E. CAYWOOD, a citizen of the United States, residing at Jacksonville, in the county of Morgan and State of Illinois, have invented certain new and useful Improvements in Draft-Eveners, of which the following is a specification.

This invention relates to improvements in draft eveners designed primarily for agricultural implements.

The object of my invention is primarily to counteract side draft, particularly in such constructions as plows, the invention consisting in the arrangement of parts and details of construction, as shown in the accompanying drawings, and more particularly set forth in the claims appended.

In the drawings:—Figure 1 is a plan view showing conventionally a gang plow, and my improvement applied thereto. Fig. 2 is a detail perspective view of the evener. Fig. 3 is an elevation of the same.

The same numerals refer to like parts in all the figures.

1 indicates the frame of a gang plow, 2 the supporting wheels, 3 the plow beams, and 4 the plows.

My improved draft evener is indicated by the numeral 7, and is attached directly to the plow beams 3. Secured to the front ends of the beams 3, is a yoke 8, comprising upper and lower spaced parallel bars 9 and 10, formed with a series of openings 11, near their ends, and end pieces 12, provided with inturned ends 13, through which and the openings 11 pass bolts 14, to connect the said end pieces to the parallel bars. The end pieces are formed with openings through which bolts 16, pass to secure the yoke to the beams.

Extending rearwardly between the parallel bars 9 and 10, and the beams 3—3 is a longitudinal bar 17, for guiding and drawing the plow which is movably connected to the respective beams 3—3. The connections between the beams 3—3 and the bar 17 comprise pivoted links 15, which may be adjusted to accommodate various widths between the beams. Each link is provided with a slot through which a clip 15ᵃ or other device is passed to secure the said links to the respective beams, said slots permitting of adjustment to properly position said links with reference to the beams. The opposite end of each link is pivoted to the longitudinal bar 17, to allow slight lateral movement between the parts.

Just in the rear of the yoke 8, I pivot to the bar 17, a preferably substantially U-shape frame 20. The end of the frame 20 adjacent bar 17 is bent outwardly sufficient to straddle the yoke 8, and the parallel front legs or members 21 of said frame extend to a point considerably beyond the yoke, and are connected by an end piece 22. The front legs or members 21, are pivoted to the center of the parallel bars 9 and 10, of the yoke 8, as shown at 23. Extending forwardly of and pivoted to the outer ends of the legs or members 21 of the frame 20, are two diverging draft bars 24, to the outer ends of which is attached the double tree 25. These draft bars 24, may be adjusted laterally on the frame 20 through the medium of the series of openings 26, and the pivot connection 27. Connecting the diverging bars 24, and the forward end of the longitudinal bar 17, is a diagonal link 28, to properly connect the various bars and guide the plow. The pivotal point 28ᵃ between the link 28 and the longitudinal bar 17, is disposed forward of the pivotal connection 23, so as to give the proper lateral motion to the bar 17 to effect the guiding and controlling of the plows.

The operation of my invention is as follows: With my invention any tendency of the plows to move toward the "land" side is counteracted by the draft of the team, which tends to keep the draft bar parallel with the line of draft, and the lever 17 also parallel thereto. The plows are thus kept from running out of a straight line, and the shares are prevented from crowding toward the "land."

The construction described is so located in advance of the ends of the plow beams that there will be no tendency for the plow to run out of the ground, neither will there be a downward pull on the hip straps of the harness.

The invention is not limited to two plows, as it is evident it may be used with a series of gangs. It is also evident that the invention is not limited to plows, but is also applicable to like structures drawn by draft animals which are subjected to side draft. Neither is the invention limited to the precise arrangement of lever 17 shown, as the lever might be supported in a different manner and yet not depart from the spirit of my invention. The yoke connection might also be modified without altering the character of the invention.

Claims—

1. The combination with a structure to be drawn, of a laterally swinging draft bar pivotally connected to said structure, for independent movement, and a laterally swinging lever connected at the rear end with the structure, and a link pivoted at one end to the forward end of the lever, and at its other end to the draft bar, and tending when the structure is subjected to lateral thrust to swing the draft bar into a position at an angle with the line of draft.

2. The combination with a structure to be drawn of a longitudinally extending draft bar, a transverse bar pivoted to the draft bar and forming a connection between the draft bar and the structure, and a longitudinally extending lever having a link connecting it with the draft bar at its forward end, the other end of the lever being connected by a link to said structure.

3. The combination with a structure to be drawn, of a draft bar linked to the structure for a lateral swinging motion, and a lever pivotally supported intermediate its end, one end of the lever having a link connection to the draft bar and the other end having pivotal connection with the said structure.

4. The combination with a structure to be drawn, and a beam therefor, of a transversely extending bar, a yoke connecting the forward end of the beam with the transverse bar, a draft bar pivoted to said transverse bar at one side of its pivotal connection to the beam, a lever pivotally supported by the transverse bar between its pivotal connection to the beam, and the pivotal connection to the draft bar, said lever extending rearwardly, a link connecting the rear end of the lever to the beam, and a link connecting the forward end of the lever to the draft bar.

5. A draft evener including a draft bar, and a bar at right angles thereto, a link extending diagonally from the forward end of the draft bar toward the transverse bar, a lever pivoted to the transverse bar intermediate its ends and pivoted at its forward end to said link, and a structure to be drawn pivotally connected to the said transverse bar, and a link pivotally connecting said structure to the lever.

6. A draft evener comprising a substantially U shaped frame having upper and lower parallel members, a yoke pivoted between the two members, a longitudinally extending lever having pivotal connection to the ends of the two members and passing through the yoke, a draft bar pivoted to the opposite end of the members of the U shaped frame and a link pivotally connecting the forward end of the draft bar to the forward end of the longitudinal lever.

7. A draft evener comprising a longitudinally extending draft bar, a substantially U-shaped frame comprising spaced parallel members, one end of the frame being pivoted to the rear end of the draft bar, a yoke pivoted between the front members of the U-shaped frame, a beam attached to said yoke, a lever pivoted to the rear portion of the U-shaped frame, and extending between the yoke, a link pivoted to the draft bar and pivotally connecting it to the forward end of the lever, and links connecting the rear end of the lever to said beam.

8. A draft evener including a yoke to which the structure to be drawn is attached, opposed transverse bars returned upon themselves at one end, said yoke being pivoted between said transverse bars intermediate their ends, a lever passing through the yoke and between the transverse bars and pivoted between the returned ends of said bars, said lever projecting forward beyond the yoke, a draft bar pivoted to the other end of the transverse bars for free lateral movement in a horizontal plane, a link connecting the forward end of said draft bar with the forward end of the lever, and connections between the said lever and the structure to be drawn whereby a movement of the lever upon its pivot will move said structure laterally.

9. A draft evener comprising a transversely extending substantially U-shaped frame, a longitudinally extending lever pivoted thereto, means extending from the said lever to connect the evener to the structure to be drawn, a yoke pivoted to the U-shaped frame in advance of its pivotal connection to the longitudinally extending lever, a draft device pivoted near the outer end of the U-shaped frame and having free lateral movement, and a link pivoted to said draft device and to the forward end of the longitudinal lever.

In testimony whereof I affix my signature in presence of two witnesses.

JAMES E. CAYWOOD.

Witnesses:
WALTER BELLATTI,
LENA C. ENGEL.